F. O. JAQUES, Sr.
MICROMETER CALIPER SPINDLE LOCK.
APPLICATION FILED AUG. 19, 1918.
1,306,906.
Patented June 17, 1919.
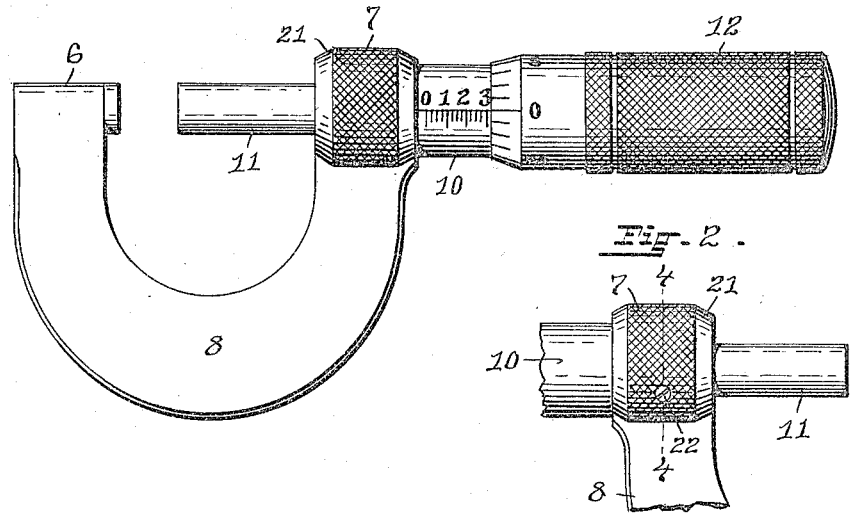
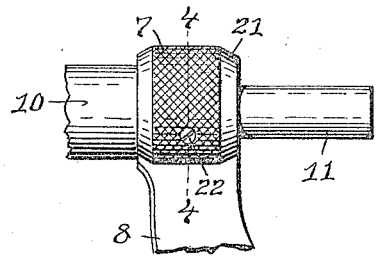
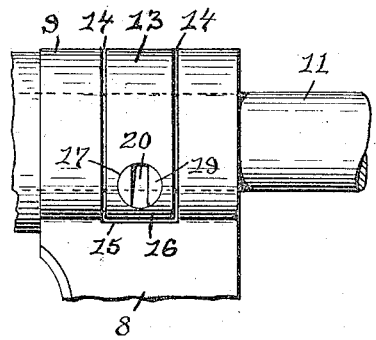
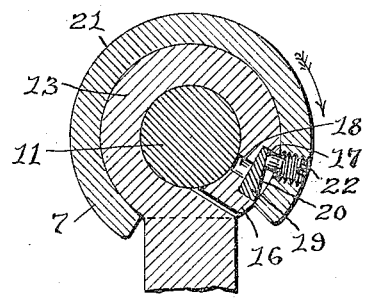
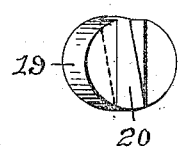
INVENTOR:
Fernando Oscar Jaques, Sr.,
by Chas. H. Luther
ATTORNEY.

UNITED STATES PATENT OFFICE.

FERNANDO OSCAR JAQUES, SR., OF PROVIDENCE, RHODE ISLAND, ASSIGNOR OF ONE-HALF TO THE CENTRAL TOOL COMPANY, OF PROVIDENCE, RHODE ISLAND, A CORPORATION OF RHODE ISLAND.

MICROMETER-CALIPER-SPINDLE LOCK.

1,306,906.

Specification of Letters Patent. Patented June 17, 1919.

Application filed August 19, 1918. Serial No. 250,522.

*To all whom it may concern:*

Be it known that I, FERNANDO OSCAR JAQUES, Sr., a citizen of the United States, residing at Providence, in the county of Providence and State of Rhode Island, have invented a new and useful Improvement in Micrometer-Caliper-Spindle Locks, of which the following is a specification.

My invention has reference to an improvement in micrometer calipers and more particularly to an improvement in spindle locks for micrometer calipers, whereby the spindle of a micrometer caliper is held against accidental movement in the ordinary handling of the micrometer.

In the usual construction of micrometer caliper spindle locks, a comparatively wide slot is cut through the spindle bearing and the locking mechanism is supported on the spindle in the slot. This creates unnecessary friction on the spindle when the lock is not in use or unlocked, as the spindle supports the weight of the locking mechanism, also the lock operating member extends out beyond the spindle bearing and forms a circular sharp corner that catches oil, grease and fine metal particles which, in turning the locking member, is worked into the spindle bearing and in time ruins the bearing.

The object of my invention is to improve the construction of a spindle lock for micrometer calipers, whereby the weight, friction and wear of the locking mechanism on the spindle, and the usual spindle lock slot in the spindle bearing is eliminated, and the spindle bearing of a micrometer caliper provided with my improved spindle lock is better protected against the entrance of fine metal particles, through the spindle lock.

Further objects of my invention are to simplify and reduce the cost of construction and to improve the operation of a micrometer caliper spindle lock.

My invention consists in the peculiar and novel construction of a micrometer caliper spindle lock in which the spindle clamping member of the lock is formed integral with the spindle bearing, said spindle lock having details of construction, as will be more fully set forth hereinafter and claimed.

Figure 1 is a front view of a micrometer caliper provided with my improved spindle lock.

Fig. 2 is a detail view of the spindle bearing portion of the micrometer caliper looking at the back of the spindle lock.

Fig. 3 is an enlarged detail back view of the spindle bearing with the lock operating member removed.

Fig. 4 is an enlarged detail transverse sectional view through the locking mechanism, taken on line 4. 4 of Fig. 2, and Fig. 5 is a still further enlarged perspective view of the cam member removed from the lock.

In the drawings 6 indicates a micrometer caliper provided with my improved spindle lock 7. The micrometer caliper 6 has the usual U shaped frame 8, spindle bearing 9, barrel 10, spindle 11, and thimble 12, the whole operating in the usual well known way.

My improved micrometer caliper spindle lock 7 consists of a locking member 13 formed integral with the spindle bearing 9 by sawing two thin slits 14. 14 through the spindle bearing and then cutting at 15 at the front through the center portion thus formed, so as to form a free end 16 on the locking member 13, as shown in Figs. 3 and 4. A circular recess 17 is formed in the outer face of the free end 16 and a center hole 18 extends from the recess 17 through the free end 16, as shown in Fig. 4. A hardened steel coin piece 19, having an inclined cam groove 20 is shaped to and fits in the recess 17. A knurled operating member 21 is shaped to fit around the spindle bearing 9 and carries a screw-pin 22, the inner end of which engages with the cam-groove 20 in the cam-piece 19. The knurled operating member 21 extends the length of the spindle bearing 9 over the locking member 13, the screw end of the operating member being away from the frame 8 a predetermined distance, to allow movement of the operating member and the other end of the operating member touching the frame, when the spindle lock is in the unlocked position, as shown in Fig. 4.

When in use the caliper is adjusted to give the required reading and the spindle locked by turning the knurled operating member 21 to the right, as shown by the arrow in Fig. 4. The inner end of the screw-pin 22 acting on the cam groove 20 in the cam-piece 19 forces the free end 16 and the greater portion of the locking member 13 on to the spindle 11 thereby frictionally locking the spindle from turning. As the force of the locking movement is toward the free end of the locking member 13 the greater portion of the locking member is forced around and against the spindle. If necessary, a freer movement may be given to the locking member 13 by reducing its thickness or by removing portions at its periphery.

It is evident that my improved micrometer caliper spindle lock could be varied in details of construction, without departing from the scope of the appended claims.

Having thus described my invention I claim as new.

1. In combination with a frame, a spindle bearing formed integral with the frame, and a spindle of a micrometer caliper, a spindle lock comprising a spindle locking member surrounding the spindle and formed integral at one end with the spindle bearing, and having a free portion, a cam groove in the free portion, an operating member over the spindle locking member and means on the operating member engaging with the cam groove in the locking member to force the free portion of the locking member against the spindle, to lock the spindle.

2. In combination with a frame, a spindle bearing formed integral with the frame, and a spindle of a micrometer caliper, a spindle lock comprising a spindle locking member surrounding the spindle and formed integral at one end with the spindle bearing, and having a free end, a cam groove in the free end, an operating member over the spindle locking member and over the spindle bearing and a screw-pin in the operating member and engaging with the cam groove in the free end of the locking member, for the purpose as described.

3. In combination with a frame, a spindle bearing formed integral with the frame, and a spindle of a micrometer caliper, a spindle lock comprising a spindle locking member surrounding the spindle and formed integral at one end with the spindle bearing and having a free end, a recess in the free end, a cam member in the recess and having a cam groove, an operating member covering the spindle bearing and the spindle locking member and turnable on the latter, a screw-pin screw-threaded through the operating member and engaging with the cam groove in the cam member, for the purpose as described.

In testimony whereof, I have signed my name to this specification.

FERNANDO OSCAR JAQUES, Sr.

Copies of this patent may be obtained for five cents each, by addressing the "Commissioner of Patents, Washington, D. C."